US009187577B2

(12) United States Patent
Lalgudi et al.

(10) Patent No.: US 9,187,577 B2
(45) Date of Patent: Nov. 17, 2015

(54) FILLED NANOPARTICLES HAVING AN ALKYLENE CARBONATE CORE AND POLYMERIC SHELL

(75) Inventors: Ramanathan S. Lalgudi, Columbus, OH (US); Jeff J. Boyce, Grove City, OH (US); Barry L. McGraw, Westerville, OH (US)

(73) Assignee: Battelle Memorial Institute, Columbus, OH (US)

( * ) Notice: Subject to any disclaimer, the term of this patent is extended or adjusted under 35 U.S.C. 154(b) by 224 days.

(21) Appl. No.: 12/995,258

(22) PCT Filed: May 12, 2009

(86) PCT No.: PCT/US2009/043593
§ 371 (c)(1),
(2), (4) Date: Jan. 21, 2011

(87) PCT Pub. No.: WO2009/146252
PCT Pub. Date: Dec. 3, 2009

(65) Prior Publication Data
US 2011/0104495 A1    May 5, 2011

Related U.S. Application Data (60) Provisional application No. 61/130,488, filed on May 30, 2008.

(51) Int. Cl.
*C08L 33/12* (2006.01)
*B32B 1/00* (2006.01)
(Continued)

(52) U.S. Cl.
CPC ... *C08F 2/22* (2013.01); *C08F 2/44* (2013.01); *Y10T 428/2987* (2015.01); *Y10T 428/2991* (2015.01); *Y10T 428/2998* (2015.01)

(58) Field of Classification Search
None
See application file for complete search history.

(56) References Cited

U.S. PATENT DOCUMENTS 3,674,704 A * 7/1972 Bayless et al. ............ 264/4.3
4,187,194 A * 2/1980 Wellman et al. ......... 427/213.36
(Continued)

FOREIGN PATENT DOCUMENTS

WO    2005002719 A1    1/2005

OTHER PUBLICATIONS

Johnsen, H., Schmid, R.B. "Preparation of polyurethane nanocapsules by miniemulsion polyaddition." Journal of Microencapsulation 24.8 (Dec. 2007): 731-742.*
(Continued)

*Primary Examiner* — Holly Le
*Assistant Examiner* — Thomas Mangohig
(74) *Attorney, Agent, or Firm* — MacMillan, Sobanski & Todd, LLC (57) ABSTRACT

A filled nanoparticle includes a nanosized polymer shell encapsulating a reactive chemical. In another aspect, a filled nanoparticle includes a nanosized polymer shell encapsulating a core which includes a reactive functional group attached to a polymer. A miniemulsion polymerization process of producing filled nanoparticles includes: providing a mixture comprising monomer, initiator or catalyst to aid polymerization, reactive chemical, surfactant and water; shearing the mixture to form a miniemulsion of nanosized particles dispersed in water, the nanosized particles comprising the monomer combined with the reactive chemical; and then heating the miniemulsion to polymerize the monomer and produce filled nanoparticles comprising a nanosized polymer shell encapsulating the reactive chemical.

12 Claims, 3 Drawing Sheets

(51) Int. Cl.
*B82Y 30/00* (2011.01)
*C08F 2/22* (2006.01)
*C08F 2/44* (2006.01)
*B01J 31/06* (2006.01)
*B01J 35/08* (2006.01)
*C09B 69/10* (2006.01)

(56) References Cited

U.S. PATENT DOCUMENTS

2002/0169247 A1* 11/2002 Kuo et al. .................... 524/457
2005/0137319 A1* 6/2005 Vincent et al. ............... 524/547
2006/0270737 A1* 11/2006 Matias ......................... 514/546
2008/0026221 A1* 1/2008 Vincent et al. ............... 428/407

OTHER PUBLICATIONS

Torini, L., Argillier, J.F., Zydowicz, N. "Interfacial Polycondensation Encapsulation in Miniemulsion." Macromolecules 38 (2005): 3225-3236.*

Li, M., Daniels, E.S. Dimonie, V., Sudol, E.D., El-Aasser, M.S. "Preparation of Polyurethane/Acrylic Hybrid Nanoparticles via a Miniemulsion Polymerization Process" Macromolecules 38 (2005): pp. 4183-4192.*

Kobaslija et al., Polyurea Microcapsules from Oil-in-Oil Emulsions via Interfacial Polymerization, Macromolecules 2006, 39, pp. 6371-6375.

* cited by examiner

FILLED NANOPARTICLES HAVING AN ALKYLENE CARBONATE CORE AND POLYMERIC SHELL

BACKGROUND OF THE INVENTION

Different encapsulation methods are known for the production of polymer microcapsules containing active substances. The microcapsules are generally produced using one or more of the following methods: phase separation, interfacial and in situ polymerization, spray drying, spray congealing, solvent evaporation, and coating.

Although many encapsulation chemistries are available, none of the earlier methods teaches a process for producing nanosize capsules containing reactive chemicals such as catalysts, functional dyes, and reactive intermediates.

SUMMARY OF THE INVENTION

This invention relates to a filled nanoparticle comprising a nanosized polymer shell encapsulating a reactive chemical.

The invention also relates to a filled nanoparticle comprising a nanosized polymer shell encapsulating a core which includes a reactive functional group attached to a polymer.

The invention also relates to a miniemulsion polymerization process of producing filled nanoparticles comprising: providing a mixture comprising monomer, initiator or catalyst to aid polymerization, reactive chemical, surfactant and water; shearing the mixture to form a miniemulsion of nanosized particles dispersed in water, the nanosized particles comprising the monomer combined with the reactive chemical; and then heating the miniemulsion to polymerize the monomer and produce filled nanoparticles comprising a nanosized polymer shell encapsulating the reactive chemical.

The invention also relates to a two-stage miniemulsion polymerization process of producing core-shell nanoparticles. In a first stage, cores are produced by the steps of: (i) providing a mixture comprising first monomer, reactive chemical, surfactant and water; (ii) shearing the mixture to form a miniemulsion of nanosized particles dispersed in water, the nanosized particles comprising the first monomer combined with the reactive chemical; and then (iii) heating the miniemulsion to polymerize the first monomer and produce nanosized cores including the first polymer attached to the reactive chemical. In a second stage, polymer shells encapsulating the cores are produced by the steps of: (i) providing a miniemulsion of nanosized particles dispersed in water, the nanosized particles comprising a second monomer combined with the cores; and then (ii) heating the miniemulsion to polymerize the second monomer and produce core-shell nanoparticles comprising shells of the second polymer encapsulating the cores.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

The present invention relates to filled nanoparticles which include a nanosized polymer shell encapsulating a reactive chemical. As used herein, the term "nanoparticles" means particles that are no larger than nanosized in any one dimension. For example, the nanoparticles may have a size within a range of from about 10 nm to about 1000 nm.

The shell of the nanoparticles can be produced from any suitable polymer or a combination of different polymers. In some embodiments of the invention, the shell is produced by a polymerization process and the resulting polymer(s) will depend on the selection of the starting monomer(s). For example, as described below, in one embodiment the nanoparticle shell is produced by a free radical aqueous miniemulsion polymerization process, and a monomer is selected that is suitable for such a process. Such a monomer may contain at least one ethylenically unsaturated group capable of undergoing addition polymerization.

Some nonlimiting examples of monomers that may be suitable include monomers selected from the group of $C_1$-$C_{18}$ alkyl methacrylate, $C_1$-$C_{18}$ alkyl acrylate, acrylic acid, methacrylic acid, and vinylaromatic monomers. Some particular examples include methyl methacrylate (MMA), n-butyl acrylate (BA), ethyl acrylate, butyl methacrylate, styrene, acrylic acid, and methacrylic acid. The resulting polymers include poly(methyl methacrylate) (PMMA) when MMA is used as the monomer and polystyrene when styrene is used as the monomer. Other examples of monomers that may be suitable include conjugated dienes such a butadiene and isoprenebutadiene, itaconic acid; vinyl acetate, vinyl versatate, ethylene, divinyl benzene or vinyltoluenes, esters of vinyl alcohol and monocarboxylic acids, such as vinyl acetate, vinyl propionate, vinyl n-butyrate, vinyl laurate and vinyl stearate, and other esters of $\alpha,\beta$-monoethylenically unsaturated mono- and dicarboxylic acids.

The reactive chemical of the filled nanoparticle can be any chemical species capable of participating in a chemical reaction. Some examples of reactive chemicals include catalysts, functional dyes, reactive intermediates, and compounds containing reactive functional groups such as isocyanate, epoxy, hydroxyl, amino, carboxyl or carbonate. In a particular embodiment, the reactive chemical includes a reactive carbonate moiety. For example, some reactive carbonates are cyclic alkylene carbonates such as propylene carbonate (PC), vinyl ethylene carbonate (VEC), ethylene carbonate, 1,2-butylene carbonate, and 2,3-butylene carbonate.

Figure 1:
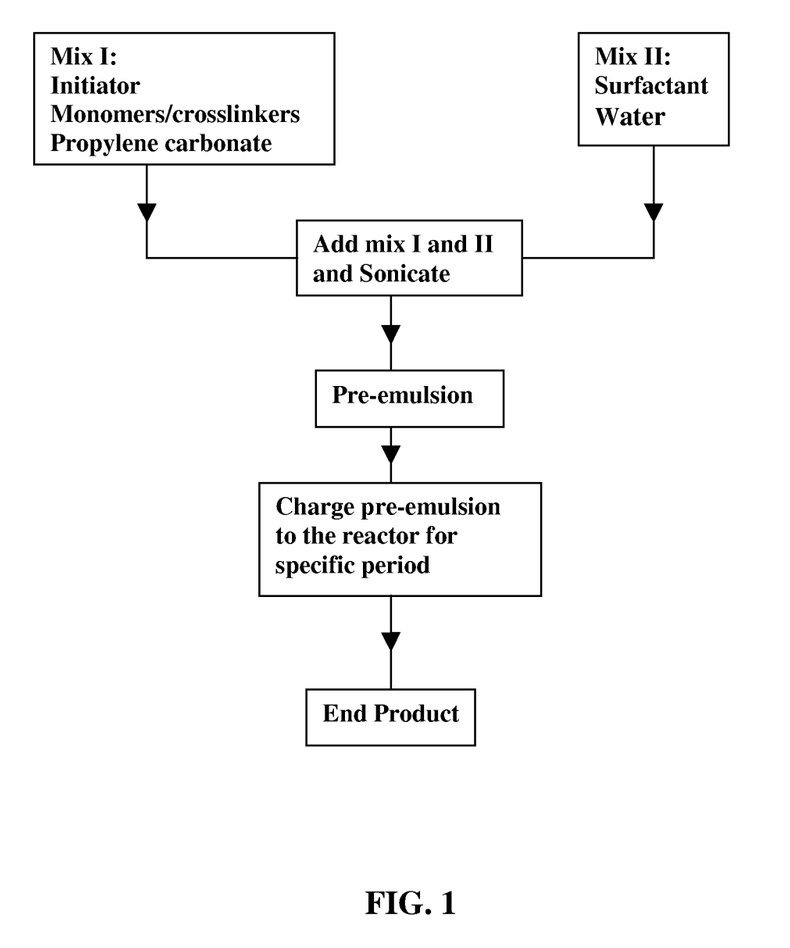
FIG. 1 is a flow chart of an example of a miniemulsion polymerization process of producing filled nanoparticles including propylene carbonate encapsulated by a polymer such as poly(methyl methacrylate), such as the process described in Example 1.

The filled nanoparticles can be produced by any suitable method. In one embodiment, the nanoparticles are produced by miniemulsion polymerization. In the miniemulsion polymerization process, an aqueous mixture is provided including the monomer or monomers, the reactive chemical, a surfactant and water. The mixture may also include a crosslinker and an initiator. The mixing of the ingredients can be in any suitable order. As shown in FIG. 1, in one embodiment of the process a first mixture (Mix I) is provided including the initiator, monomer(s), crosslinker(s) and reactive chemical (propylene carbonate), a second mixture (Mix II) is provided including the surfactant and water, and the two mixtures are then combined.

Any suitable surfactant or combinations of different surfactants can be used in the process. The surfactants can be anionic, cationic, zwitterionic, neutral, low molecular weight, macromolecular, synthetic, extracted, or derived from natural sources. Some examples include, but are not limited to, sodium dodecylsulfate (SDS), sodium dodecylbenzenesulfonate, sulfosuccinate esters, fluorosurfactants, ethoxylated alkylphenols, ethoxylated alkylphenol sulfates, phosphate ester surfactants, hexadecyltrimethylammonium bromide, polyoxyethylenated long-chain amines and their quaternized derivatives, ethoxylated silicones, alkanolamine condensates, polyethylene oxide-co-polypropylene oxide block copolymers, N-alkylbetaines, N-alkyl amine oxides, and fluorocarbon-poly(ethylene oxide) block surfactants.

Also, any suitable initiator or combinations of different initiators can be used in the process. The initiators may include any suitable water- and/or oil-soluble free-radical initiators. Some examples of initiators which may be used include azo initiators, examples being azodinitriles such as azobisisobutyronitrile (AIBN); dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; peroxodicarbonates such as bis(4-tert-butylcyclohexyl) peroxodicarbonate potassium, sodium or ammonium peroxodisulfate; C—C-cleaving initiators such as benzpinacol silyl ethers; or a combination of a nonoxidizing initiator with hydrogen peroxide.

Further, any suitable crosslinker or graftlinker or different combinations thereof can be used in the process. Some examples include ethylenically unsaturated monomers such as trimethylol-propane triacrylate (TMPTA) or trimethylolpropane trimethacrylate, butylene glycol dimethacrylate, alkanepolyol-polyacrylates or alkane polyol-polymethacrylates such as ethylene glycol diacrylate, ethylene glycol dimethacrylate, butylene glycol diacrylate, oligoethylene glycol diacrylate, oligoethylene glycol dimeth-acrylate, trimethylolpropane diacrylate, trimethylolpropane dimethacrylate, and unsaturated carboxylic acid allyl esters such as allyl acrylate, diallyl maleate, allyl methacrylate, divinylbenzene, divinylpyridine, divinyltoluene, diallyl phthalate, ethylene glycol diacrylate, ethylene glycol dimethacrylate, divinylxylene, divinylethylbenzene, divinylsulfone, divinylketone, divinylsulfide, allyl methacrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N-methylene dimethacrylamide, N,N-methylene dimethacrylamide, N,N-ethylenediacrylamide, trivinylbenzene, and the polyvinyl ethers of glycol, glycerol, pentaerythritol, resorcinol, monothio and dithio derivatives of glycols.

Optionally a diluent may be included in the mixture of monomer, reactive chemical and other ingredients. Any suitable diluent or a combination of different diluents can be used. Some examples of diluents that may be suitable include hydrocarbons, especially hexanes and heptanes, halogenated hydrocarbons, especially chlorinated hydrocarbons and the like. Specific examples include but are not limited to nonane, propane, isobutane, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, decane, dodecane, undecane, hexane, methyl cyclohexane, cyclopropane, cyclobutane, cyclopentane, methylcyclopentane, 1,1-dimethylcyclopentane, cis 1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and the halogenated versions of all of the above.

After the aqueous mixture of ingredients is provided, the mixture is subjected to shear to form a miniemulsion of nanosized particles dispersed in water. The nanosized particles comprise the monomer combined with the reactive chemical. Any suitable shearing device can be used. For example, a high shear field can be created by devices such as ultrasonifiers, homogenisers and microfluidisers, which rely on mechanical shear and/or cavitation to break the monomer into nanosized particles. In a particular example the mixture is sonicated using a Misonix ultrasonic liquid processing system. As shown in FIG. 1, Mix I and Mix II are combined and then sonicated to produce a miniemulsion which is called a pre-emulsion (because it is the material prior to the polymerization step).

As further shown in FIG. 1, the pre-emulsion is then charged into a polymerization reactor and heated for a specific period to polymerize the monomer. The polymerization reactor can be any suitable continuous or batch equipment capable of polymerizing the monomer and producing the filled nanoparticles. Any suitable polymerization temperatures and times can be used, such as a temperature within a range of from about 50° C. to about 100° C. for a time within a range of from about 0.5 hour to about 10 hours.

The end product of the polymerization process shown in FIG. 1 is filled nanoparticles which comprise nanosized polymer shells encapsulating the reactive chemical. Preferably, the polymerization process is efficient in encapsulating the reactive chemical within the polymer shells. In some embodiments, at least about 70 wt % of the reactive chemical added to the mixture is encapsulated in the polymerization process, and preferably at least about 80 wt %.

In another embodiment of the invention, the filled nanoparticles include a nanosized polymer shell encapsulating a core which includes a reactive chemical attached to a polymer. These particles can be referred to as core-shell nanoparticles. The polymers used in the shell and core, and the reactive chemical, can be any of those described above or others.

Figure 2:
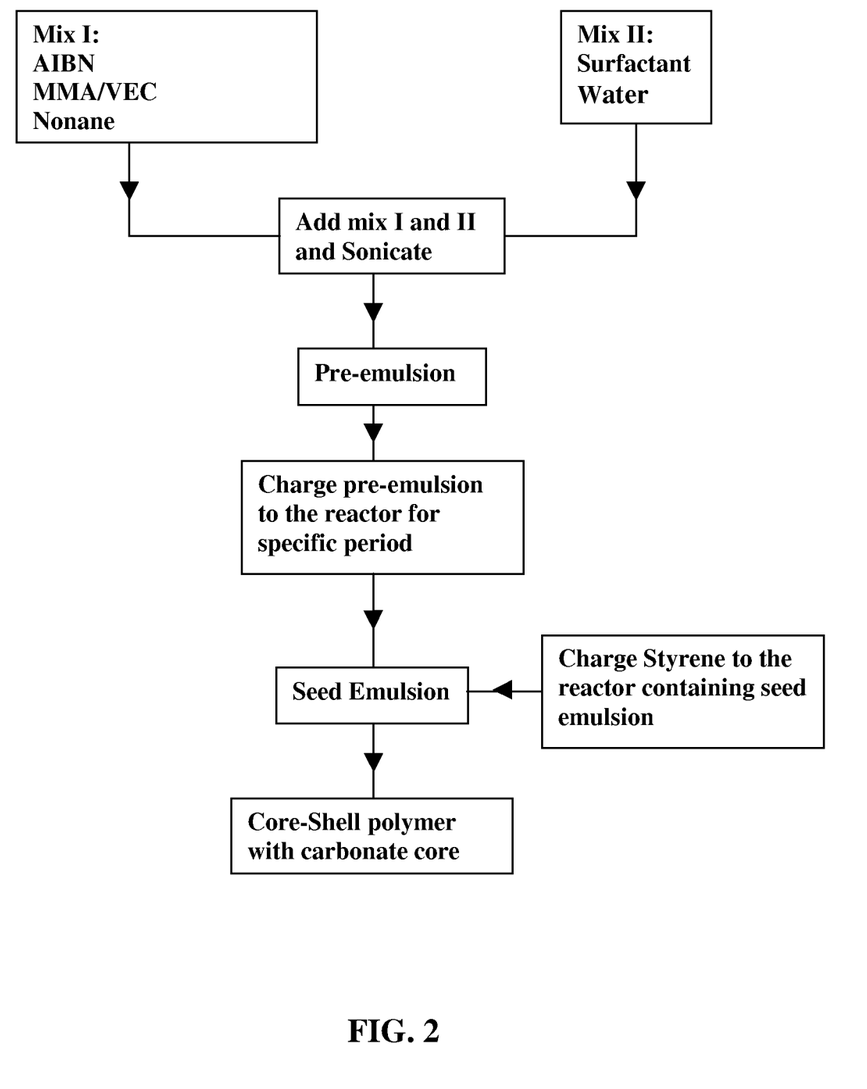
FIG. 2 is a flow chart of an example of a two-stage miniemulsion polymerization process of producing core-shell nanoparticles including cores made from poly(methyl methacrylate) and vinyl ethylene carbonate encapsulated by shells made from polystyrene, such as the process described in Example 2.
Figure 3:
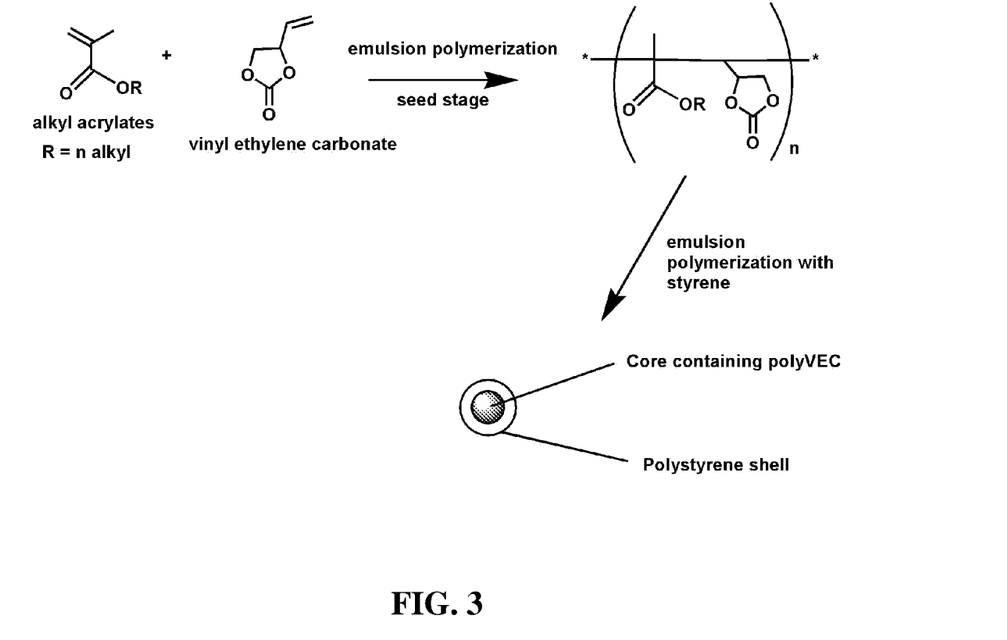
FIG. 3 shows an example of a reaction scheme of a two-stage miniemulsion polymerization process of producing core-shell nanoparticles including cores made from poly(alkyl acrylate) and vinyl ethylene carbonate encapsulated by shells made from polystyrene, such as the reaction described in Example 2.

The core-shell nanoparticles can be produced by any suitable method. As shown in FIGS. 2 and 3, in one embodiment they are produced by a two-stage miniemulsion polymerization process. A first stage of the process produces the cores of the nanoparticles. In a first step of this first stage, an aqueous mixture is provided including a first monomer or monomers, a reactive chemical, a surfactant, water, and any other suitable material. These materials can be the same or different from those described above for the first embodiment. As shown in FIG. 2, in one example of the process a first mixture (Mix I) is provided including the initiator (AIBN), a monomer (MMA), a reactive chemical (VEC) and a diluent (nonane), a second mixture (Mix II) is provided including a surfactant and water, and the two mixtures are then combined.

After the aqueous mixture of ingredients is provided, the mixture is subjected to shear to form a miniemulsion of nanosized particles dispersed in water. The nanosized particles comprise the first monomer combined with the reactive chemical. Any suitable shearing device can be used. As shown in FIG. 2, Mix I and Mix II are combined and then sonicated to produce a pre-emulsion in the form of a miniemulsion.

As further shown in FIG. 2, the pre-emulsion is then charged into a polymerization reactor and heated for a specific period to polymerize the first monomer and thereby produce a first polymer. Any suitable polymerization equipment, temperature and time can be used. The polymerization of the first monomer produces nanosized cores including the first polymer attached to the reactive chemical. As shown in FIG. 2, an emulsion of the cores in water after the polymerization step is called a seed emulsion.

The reactive chemical can be attached to the first polymer in any suitable manner. In one embodiment the reactive chemical is chemically bonded to the first polymer at any suitable location; for example, it may be bonded to the backbone of the polymer. As shown in FIG. 3, the reactive chemical is vinyl ethylene carbonate and the monomer is an alklyl acrylate such as methyl methacrylate. The miniemulsion polymerization step, which is called the seed stage, produces a poly(alkyl acrylate) polymer with the vinyl ethylene carbonate bonded or tethered to the polymer backbone. The reactive ingredient in this case is a carbonate moiety of the vinyl ethylene carbonate which has a reactivity similar to that of propylene carbonate. The attachment of the reactive chemical to the polymer of the core is expected to enhance the storage stability of the nanoparticles.

A second stage of the two-stage miniemulsion polymerization process produces polymer shells that encapsulate the cores produced in the first stage. In a first step of the second stage, a miniemulsion is provided of nanosized particles dispersed in water, where the nanosized particles comprise a second monomer combined with the cores. The second monomer can be the same or different from the first monomer which is used in the first stage. This miniemulsion can be provided in any suitable manner. For example, the miniemulsion can be provided by adding the second monomer to the polymerization product of the first stage. As shown in FIG. 2, the polymerization product in the reactor is called a seed emulsion, and a second monomer (styrene) is charged to the reactor containing the seed emulsion to produce the miniemulsion. Alternatively, the miniemulsion can be provided by providing an aqueous mixture comprising the cores, the second monomer, surfactant and water, and shearing the mixture to form the miniemulsion.

The miniemulsion is then heated to polymerize the second monomer and thereby produce core-shell nanoparticles comprising shells of the second polymer encapsulating the cores. Again any suitable polymerization equipment, temperature and time can be used. As shown in FIGS. 2 and 3, the polymerization of the second monomer in the miniemulsion produces core-shell nanoparticles which include a core containing vinyl ethylene carbonate (VEC) attached to the backbone of the poly(alkyl acrylate), and a shell made from polystyrene which encapsulates the core.

Although the two embodiments of the filled nanoparticles have been described primarily in terms of miniemulsion polymerization processes, it is recognized that the filled nanoparticles can also be produced by other processes. For example, other particle forming polymerization processes could be used, such as emulsion polymerization, suspension polymerization or dispersion polymerization.

When the nanoparticles are used in different applications, the nanoparticles can release the reactive chemical upon rupture of the polymer shell. In some embodiments, the polymer shell is tailored for a particular application to release the reactive chemical under specified conditions such as temperature, pressure, pH etc. In one embodiment, the Tg of the polymer forming the polymer shell is 50° C., and the temperature is increased from room temperature to 80° C. to rupture the polymer shell and release the reactive chemical.

The properties of the nanoparticles, for example their solubility, reactivity and storage stability, can be modified by varying the type of polymer used in the shell and the type of reactive chemical, and in the core-shell embodiment by varying the type of polymer used in the core and the attachment of the reactive chemical to the polymer. For example, these properties can be modified by using a polymer such as polyurethane in the shell in place of polystyrene.

In some embodiments the filled nanoparticles have a controlled particle size to increase their usefulness in particular applications. For example, the nanoparticles may have a particle size in their largest dimension (such as their major diameter) less than about 500 nm and more particularly less than about 300 nm. The nanoparticles may have a particle size distribution less than about 1.5 and more particularly less than about 1.2.

The storage stability of the thermoset resins containing filled nanoparticles can be measured by any suitable method. For example, the miniemulsion including the filled nanoparticles from the polymerization reactor is added to a thermoset resin, namely phenol-formaldehyde (resol resin), and the stability can be measured by R.T. viscosity after 7 days and 14 days storage at 25° C. Any suitable equipment can be used, such as a Brookfield CAP 200 viscometer, using spindle type 04, spindle speed 300 RPMs, and measured at 25° C. In some embodiments, the resol resin containing the filled nanoparticles has a viscosity of not more than about 1.75 poise, and more particularly not more than about 1.5 poise, after 7 days storage, and/or a viscosity of not more than about 2.5 poise, and more particularly not more than about 2.25 poise, after 14 days storage.

Many different products can be made including the filled nanoparticles along with other materials suitable for a particular product. Some nonlimiting examples of products that could be made include storage stable two-pack resins, energy efficient construction items such as windows and building materials, corrosion indicators and protectors, and biological and chemical sensors.

In one embodiment the product is a resin for board applications including the filled nanoparticles as a catalyst system in the resin. Such resins can include, for example, any of those mentioned above, or any suitable thermoset resins, such as phenol formaldehyde resins, polyurethanes, alkyd resins, epoxies, or mixtures thereof.

In a particular example, the resin is a low temperature, fast cure phenol formaldehyde resin. The nanoparticles can be included in the resin in any suitable amount. For example, the miniemulsion including the nanoparticles can be included in an amount within a range of from about 5% to about 20% by total weight of the resin.

EXAMPLE 1

A miniemulsion polymerization process was used to produce filled nanoparticles including propylene carbonate (PC) encapsulated by poly(methyl methacrylate) (PMMA). The raw materials used in this process and their source are shown in the following table:

| Materials | Source |
|---|---|
| Methyl methacrylate (MMA) | Aldrich |
| Butyl acrylate (BA) | Aldrich |
| 2,2'-azobisisobutyronitrile (AIBN) | Aldrich |
| Sodium dodecyl sulfate (SDS) | EMD Chemical Inc. |
| Propylene carbonate (PC) | Aldrich |
| Trimethylol propane triacrylate (TMPTA) | Aldrich |

*-continued*

| Materials | Source |
|---|---|
| Polyethylene glycol (Mn ~250) dimethacrylate (PEGDMA) | Aldrich |

Step 1: In a 250 mL beaker, weigh 0.85 g AIBN ($5.17 \times 10^{-3}$ moles) 40.11 g MMA ($4 \times 10^{-1}$ moles), 20.06 g PC ($1.96 \times 10^{-1}$ moles) and mix them well. In a separate 300 mL beaker containing a magnetic stir bar, add 150 mL water and 2.5 g SDS. Place the beaker on a stir plate and stir until SDS is completely dissolved. Cool the beaker using an ice bath and add the monomer/PC/AIBN mixture dropwise with good agitation. After complete addition, the preemulsion formed is sonicated under cooling for 3 seconds using a Misonix ultrasonic liquid processing system (Model 3000). The ultrasonic power is adjusted to 50 to 54 W during operation.

Step 2: In a reaction kettle fitted with an overhead stirrer, addition funnel, gas inlet tube and thermocouple charge 150 mL water. Pass argon gas through the gas tube and heat the kettle to 60 deg C. Add the preemulsion from Step 1 over a period of 2 hours. After addition, raise the temperature to 75 deg C. and maintain the temperature for 3 hours followed by cooling to room temperature. Filter the emulsion through a paint filter size 32×28 coarse (Paul N Gardner Co. Inc.).

| | 50802-16-1 | 50802-18-1 | 50802-18-16 | 50802-19-2 | 50802-19-16 | 50802-20-1 |
|---|---|---|---|---|---|---|
| Amounts in grams | Run 0 | Run 1 | Run 2 | Run 3 | Run 4 | Run 5 |
| AIBN | 1.275 | 1.275 | 1.275 | 1.275 | 1.275 | 1.275 |
| MMA | 60 | 56.25 | 52.5 | 0 | 0 | 0 |
| Styrene | 0 | 0 | 0 | 60 | 56.25 | 52.5 |
| Butyl Acrylate | 0 | 3.75 | 7.5 | 0 | 3.75 | 7.5 |
| Propylene carbonate | 60 | 30 | 30 | 30 | 30 | 30 |
| SDS | 3.75 | 3.75 | 3.75 | 3.75 | 3.75 | 3.75 |
| TMP Triacrylate | 0 | 0 | 0 | 0 | 0 | 0 |
| PEG diacrylate | 0 | 0 | 0 | 0 | 0 | 0 |
| Water (in mL) | 450 | 450 | 450 | 450 | 450 | 450 |
| Pluronic L64 | 0 | 0 | 0 | 0 | 0 | 0 |
| SDS | 0 | 0 | 0 | 0 | 0 | 0 |

| | 50802-25-1 | 50802-25-17 | 50802-26-1 | 50802-27-1 | 50802-29-1 | 50802-29-16 |
|---|---|---|---|---|---|---|
| Amounts in grams | Run 1a | Run 7 | Run 8 | Run 9 | run 10 | run 11 |
| AIBN | 1.275 | 1.275 | 1.275 | 1.275 | 1.275 | 1.275 |
| MMA | 56.25 | 52.5 | 52.5 | 52.5 | 52.5 | 52.5 |
| Styrene | 0 | 0 | 0 | 0 | 0 | 0 |
| Butyl Acrylate | 3.75 | 7.5 | 7.5 | 7.5 | 7.5 | 7.5 |
| Propylene carbonate | 30 | 30 | 30 | 0 | 60 | 45 |
| SDS | 3.75 | 3.75 | 3.75 | 3.75 | 3.75 | 3.75 |
| TMP Triacrylate | 0 | 1.2 | 6 | 0 | 6 | 6 |
| PEG diacrylate | 0 | 0 | 0 | 0 | 0 | 0 |
| Water (in mL) | 450 | 450 | 450 | 450 | 450 | 450 |
| Pluronic L64 | 0 | 0 | 0 | 0 | 0 | 0 |
| SDS | 0 | 0 | 0 | 0 | 0 | 0 |

| | 50802-30-2 | 50802-31-1 | 50802-31-17 | 50802-32-2 | 50802-32-17 | 50802-33-1 |
|---|---|---|---|---|---|---|
| Amounts in grams | Run 12 | run 13 | run 14 | run 15 | run 16 | run 17 |
| AIBN | 1.275 | 1.275 | 1.275 | 1.275 | 1.275 | 1.275 |
| MMA | 56.25 | 52.5 | 52.5 | 52.5 | 52.5 | 52.5 |
| Styrene | 0 | 0 | 0 | 0 | 0 | 0 |
| Butyl Acrylate | 3.75 | 7.5 | 7.5 | 7.5 | 7.5 | 7.5 |
| Propylene carbonate | 30 | 37.5 | 45 | 37.5 | 37.5 | 37.5 |
| SDS | 3.75 | 3.75 | 3.75 | 3.75 | 3.75 | 3.75 |
| TMP Triacrylate | 0 | 6 | 12 | 0 | 0 | 1.2 |
| PEG diacrylate | 0 | 0 | 0 | 0 | 6 | 0 |
| Water (in mL) | 225 | 450 | 450 | 450 | 450 | 450 |
| Pluronic L64 | 0.75 | 0 | 0 | 0 | 0 | 0 |
| SDS | 0.75 | 0 | 0 | 0 | 0 | 0 |

EXAMPLE 2

A two-stage miniemulsion polymerization process was used to produce core-shell nanoparticles comprising cores made from poly(methyl methacrylate) (PMMA) and vinyl ethylene carbonate (VEC) encapsulated by shells made from polystyrene.

First Stage—Synthesis of PMMA-VEC Cores:

Step 1: In a 250 mL beaker, weigh 0.84 g AIBN ($5.17 \times 10^{-3}$ moles) 40.13 g MMA ($4 \times 10^{-1}$ moles), 20.09 g VEC ($1.76 \times 10^{-1}$ moles) and mix them well. In a separate 300 mL beaker containing a magnetic stir bar, add 150 mL water and 2.51 g SDS. Place the beaker on a stir plate and stir until SDS is completely dissolved. Cool the beaker using an ice bath and add the monomer/AIBN mixture dropwise with good agitation. After complete addition, the preemulsion formed is sonicated under cooling for 3 seconds using a Misonix ultrasonic liquid processing system (Model 3000). The ultrasonic power is adjusted to 50 to 54 W during operation.

Step 2: In a reaction kettle fitted with an overhead stirrer, addition funnel, gas inlet tube and thermocouple charge 150 mL water. Pass argon gas through the gas tube and heat the kettle to 60 deg C. Add the preemulsion from Step 1 over a period of 2 hours. After addition, raise the temperature to 75 deg C. and maintain the temperature for 3 hours followed by cooling to room temperature. Filter the emulsion through a paint filter size 32×28 coarse (Paul N Gardner Co. Inc.).

Second Stage—Encapsulation of PMMA-VEC Cores in Polystyrene Shells:

In a 250 mL beaker weigh 101.88 g of the seed emulsion (PMMA-VEC) from step 2 and add 0.6 g SDS, mix well over a stir plate. Place the beaker on an ice bath after SDS is completely dissolved. Add 7.11 g of styrene dropwise over a period of 10 min and stir for 2 hours and maintain the temperature between 4 and 10 deg C. The swollen preemulsion thus formed is sonicated under cooling for 3 seconds using a Misonix ultrasonic liquid processing system (Model 3000). The ultrasonic power is adjusted to 50 to 54 W during operation. Transfer the preemulsion to a reaction kettle fitted with an overhead stirrer, addition funnel, gas inlet tube and thermocouple. Pass argon gas through the gas tube and heat the kettle to 60 deg C. Add 23 mL water containing 0.1565 g of ammonium persulfate to the kettle over a period of 30 min. Continue the polymerization at 60 deg for 1 hr and then raise the temperature to 75 deg C. and maintain the temperature for 2 hours. Cool the reactor to room temperature and filter the emulsion through a paint filter size 32×28 coarse (Paul N Gardner Co. Inc.).

EXAMPLE 3

Using miniemulsion polymerization techniques to encapsulate dyes or corrosion inhibitors for the purpose of putting in a surface paint or coating that will give a visual indicator when damage or corrosion has occurred, or release a corrosion inhibiting material that will stop or slow the damage caused by the initial damage or corrosion. The release of either the indicating dye or corrosion inhibitor will occur when damage occurs to the encapsulating material. This will either be physical damage such as an impact, scratch or bend, or as result of attack on the capsule by chemicals produced by the corrosion process.

| Ingredients | 51639-16-Run1 Run 1 | 51639-16-Run2 Run 2 |
|---|---|---|
| Water (in mL)-1 | 150 | 150 |
| SDS-1 | 1 | 1 |
| AIBN-1 | 0.85 | 0.4 |
| MMA-1 | 50 | 25 |
| Propylene carbonate/Dye Solution | 10 | 50 |
| SDS-2 | 2 | 2 |
| Water (in mL)-2 | 75 | 25 |
| AIBN-2 | 0.85 | 0.4 |
| MMA-2 | 50 | 25 |
| SDS-3 | 2 | 2 |
| Water (in mL)-3 | 50 | 25 |
| Reaction Volume | 391.7 | 305.8 |

Procedure
1. Water 1 and SDS into 500 mL 4 neck Reactor and preheat to 60 C.
2. Dissolve AIBN-1 in MMA-1 and Propylene Carbonate/Dye Solution and add this mixture to water-2 containing SDS-2 with agitation and preemulsify with sonication, 6 times, 30 s each at 50-54 watt power.
3. Add the preemulsion to the reaction kettle slowly over a time of 1 hr and cook for 2 hr at 60 C.
4. Dissolve AIBN-2 in MMA-2 and add this solution to water-3 containing dissolved SDS-3 with agitation and preemulsify with sonication, 6 times, 30 s each at 50-54 watts.
5. Add the above preemulsion to the reaction kettle slowly over a time of 1 hr and cook for 4 hr.

A second method for doing dye encapsulation. This follows miniemulsion polymerization steps outlined in examples 1 and 2.

| Description- Dye Encapsulation 51639-22-1 | | |
|---|---|---|
| | Ingredient | Quantity |
| Beaker 1 (400 mL) Mixed and placed in ice bath on magnetic stirrer | Water | 100 mL |
| | SDS | 10.0 g |
| Beaker 2 (300 mL) Mix in beaker and slowly add to Beaker 1 while stirring. Sonicate this mix 6 times for 30 s at 50-54 Watts | AIBN | 3.4 g |
| | MMA | 150 g |
| | Butyl Acrylate | 10 g |
| | Propylene Carbonate/Dye Emulsion | 40 g |
| Reaction Kettle with overhead stirrer and argon purge. (500 mL) Preheat to 60 C. and add emulsion from above with addition funnel over a period of 1 hr. After addition is complete cook for 4 hours. | Water | 100 mL |

Method and Formulations of Dye and Oil Encapsulation. These follow miniemulsion polymerization methods outlined in previous examples.

| Description- Dye Encapsulation and encapsulation of microtek damage indicating coating, and corrosion inhibiting oils | | | | | |
|---|---|---|---|---|---|
| | Ingredient | 51639-22-1 | 51639-3 | 51639-4 | 51639-5 |
| Beaker 1 (400 mL) Mixed and placed in ice bath on magnetic stirrer | Water (mL) | 100 | 125 | 125 | 125 |
| | SDS (g) | 10.00 | 2.50 | 2.50 | 2.50 |
| | Microtek Capsules M54-91 (g) | | 40.00 | 40.00 | 40.00 |
| | Super Corr B w/alcohol 217RK58 (g) | | | | |
| | Super Corr B alcohol evaporated 217RK59 (g) | | | | |
| Beaker 2 (300 mL) Mix in beaker and slowly add to Beaker 1 while stirring. Sonicate this mix 6 times for 30 s at 50-54 Watts | AIBN (g) | 3.40 | 0.85 | 0.85 | 0.85 |
| | MMA (g) | 150.00 | 35.00 | 35.00 | 35.00 |
| | Styrene (g) | | 5.00 | 5.00 | 5.00 |
| | TMP Triacrylate (g) | | 4.00 | 4.00 | 4.00 |
| | Butyl Acrylate (g) | 10.00 | | | |
| | Propylene Carbonate/Dye Emulsion (g) | 40.00 | | | |

-continued

Description- Dye Encapsulation and encapsulation of microtek damage indicating coating, and corrosion inhibiting oils

| | Ingredient | 51639-22-1 | 51639-3 | 51639-4 | 51639-5 |
|---|---|---|---|---|---|
| Reaction Kettle with overhead stirrer and argon purge. (500 mL) Preheat to 60 C. and add emulsion from above with addition funnel over a period of 1 hr. After addition is complete cook for 4 hours. | Water (mL) Ammonium Persulfate (g) | 100 | 125 | 125 .25 g in 3.5 mL | 125 .25 g in 3.5 mL |

EXAMPLE 4

Encapsulation of Formic Acid
51639-37 Formic Acid Encapsulation
Methyl Methacrylate 30.00 g
MA 5.0 g
AIBN 0.5 g
HCOOH (Formic Acid) 5.0 g
Paraffin Oil 96.3 g
PLMA-g-PEO 4.86 g
Place ½ of paraffin oil and ½ of plma-g-peo in 3 neck round bottom flask and heat using oil bath to 60 C. Use over head stirrer and keep reaction under Argon.
In beaker add 1) AIBN 2) MMA 3) MA 4) HCOOH
In separate beaker place remaining paraffin oil and plma-g-peo
slowly add beaker in step 2 to beaker in step 3 while stirring on magnetic stirrer and at room temperature
Slowly add the mix from step 4 into heated reactor using addition funnel, while stirring. Keep under Argon.
After addition is complete (within about 10 minutes) material in reactor started to gel. It looked like rice at first then started to gel in the flask.
Material was thinned with petrol ether and poured into a clean beaker. The material was washed thoroughly with petrol ether and filtered with #2 filter paper and a Buchner funnel.
It was then dried and became a uniform white powder sulation of Formic Acid.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A plurality of filled nanoparticles, each filled nanoparticle comprising a nanosized polymer shell encapsulating a core;
   the core including cyclic alkylene carbonate groups selected from the group consisting of propylene carbonate, ethylene carbonate, vinyl ethylene carbonate, 1,2-butylene carbonate, 2,3-butylene carbonate, and combinations thereof;
   the core further including a core polymer produced by polymerization of core monomers selected from the group consisting of C1-C18 alkyl methacrylates, C1-C18 alkyl acrylates, and combinations thereof;
   the cyclic alkylene carbonate groups covalently bonded as side chains to the backbone of the core polymer;
   the shell formed from a shell polymer produced by polymerization of shell monomers selected from the group consisting of $C_1$-$C_{18}$ alkyl methacrylates, $C_1$-$C_{18}$ alkyl acrylates, acrylic acid, methacrylic acid, vinylaromatic monomers, and combinations thereof;
   the shell polymer being distinct from the core polymer, and the shell polymer being a different type of polymer from the core polymer;
   the filled nanoparticles having a particle size less than about 300 nm and a size distribution less than about 1.2;
   the filled nanoparticles produced by a two-stage miniemulsion polymerization process comprising:
   (a) in a first stage, producing the cores by the steps of:
      (i) producing a mixture comprising the core monomers, the cyclic alkylene carbonate groups, surfactant and water;
      (ii) shearing the mixture to form a miniemulsion of nanosized particles dispersed in water, the nanosized particles comprising the core monomers combined with the cyclic alkylene carbonate groups; and then
      (iii) heating the miniemulsion to polymerize the core monomers and produce nanosized cores including the core polymer and the cyclic alkylene carbonate groups covalently bonded as side chains to the backbone of the core polymer; and then
   (b) in a second stage, producing the polymer shells encapsulating the cores by the steps of:
      (i) providing a miniemulsion of nanosized particles dispersed in water, the nanosized particles comprising the shell monomers combined with the cores; and then
      (iii) heating the miniemulsion to polymerize the shell monomers and produce core-shell nanoparticles comprising shells of the shell polymer encapsulating the cores.

2. The filled nanoparticles of claim 1 wherein the miniemulsion of step (b)(i) is provided by providing a mixture comprising the cores, the shell monomers, surfactant and water, and shearing the mixture to form the miniemulsion.

3. The filled nanoparticles of claim 1 wherein the core includes propylene carbonate.

4. The filled nanoparticles of claim 1 wherein the core includes vinyl ethylene carbonate.

5. The filled nanoparticles of claim 1 wherein the shell monomers are vinylaromatic monomers.

6. The filled nanoparticles of claim 5 wherein the shell polymer is polystyrene.

7. The filled nanoparticles of claim 1 wherein the core monomers are selected from the group consisting of C1-C18 alkyl methacrylates.

8. The filled nanoparticles of claim 7 wherein the core polymer is poly(methyl methacrylate).

9. The filled nanoparticles of claim 1 wherein the shell polymer is produced by polymerization of shell monomers selected from the group consisting of $C_1$-$C_{18}$ alkyl methacrylates, $C_1$-$C_{18}$ alkyl acrylates, and combinations thereof.

10. The filled nanoparticles of claim 9 wherein the shell monomers are selected from the group consisting of $C_1$-$C_{18}$ alkyl methacrylates.

11. The filled nanoparticles of claim 10 wherein the shell polymer is poly(methyl methacrylate).

12. The filled nanoparticles of claim 1 wherein the core includes vinyl ethylene carbonate, the core polymer is poly(methyl methacrylate) and the shell polymer is polystyrene.

* * * * *